Sept. 9, 1969     J. H. VIGNEAULT     3,465,627

POLYTETRAFLUOROETHYLENE COATED HOT CUTTING DIE

Filed Sept. 20, 1967

INVENTOR
JOHN H. VIGNEAULT

BY

ATTORNEYS

United States Patent Office 3,465,627
Patented Sept. 9, 1969

3,465,627
POLYTETRAFLUOROETHYLENE COATED HOT CUTTING DIE
John H. Vigneault, Cleveland, Ohio, assignor to Coated Products, Inc., Middlesex, N.J., a corporation of New Jersey
Filed Sept. 20, 1967, Ser. No. 669,243
Int. Cl. B26d 7/10; B26f 1/14
U.S. Cl. 83—171        7 Claims

ABSTRACT OF THE DISCLOSURE

A cutting die for cutting through an adhesive-backed thermoplastic film releasably adhered to a release paper, the die being constructed of a material adapted to be heated to a temperature above the melting temperature of the film and having a raised cutting surface coated with polytetrafluoroethylene and configured in the pattern to be cut in the film.

BACKGROUND OF THE INVENTION

Field of the invention

This invention pertains to a cutting die and more particularly to a heated cutting die for producing a hot kiss cutting of an adhesive-backed thermoplastic film releasably adhered to an underlying release paper.

Description of the prior art

In producing adhesive-backed labels, numerals, letters and other patterns from a thermoplastic film such as plasticized, cast vinyl film, it is the present practice to adhere the film in sheet form to an underlying release paper and then cut the film while on the release paper to produce one or more cut patterns. These patterns are cut in such a manner that they become separated from the remaining portion of the film while both the patterns and the remaining portion of the film remain adhered to the release paper. When one desires to use a particular cut pattern, he simply peels it away from the release paper; and due to the separation between the pattern and the remaining portion of the film, this is easily effected leaving just the excess unpatterned portion of the film on the release paper which may be discarded after all the patterns have been removed.

Presently available cutting presses for cutting the film while film while on the release paper to produce a finished product includes a cutting die and cooperating bed plate between which the composite uncut film and release paper is placed. To effect cutting, the cutting die is heated to a temperature of 325°–350° F. and then moved through a cutting stroke toward the bed plate to a position where the cutting edge of the die cuts completely through the film but merely grazes the underlying release paper without effecting a cutting thereof, this type of cutting being referred to as hot kiss cutting. The cutting edge of the die effects a cutting of the film while at the same time the heat supplied to the die melts the film as the cutting edge passes therethrough.

In a cutting press of this construction, the melting of the film material and its adhesive backing, as produced during the cutting, creates a condition which tends to cause the film to stick to the cutting die; and when the press is opened to permit removal of the finished cut product, it sometimes remains stuck to the die at one or more points along the cut pattern. Removal of the composite product from the cutting die without damaging the film or removing it from the undelying release paper is time consuming and requires careful handling of the product by the press operator.

To avoid sticking of the composite product to the cutting die, it is the present practice to secure sponge rubber onto the face of the die in the relieved areas about the cutting edge. This sponge rubber is constructed with a thickness greater than the height of the cutting edge of the die so that it will be caused to compress against the film during a cutting operation; and therefore, as the cutting die is moved away from the underlying bed plate after a cutting operation, the sponge rubber will hold the product on the bed plate until it expands to its original thickness and the cutting edge of the die has been completely removed from the film. The use of a sponge surface on a cutting die, however, adds to the expense of the die and thus the expense of the product being produced. In addition, the sponge rubber is subject to deterioration as caused by the heating of the die and the continuing compression and expansion thereof during each cutting cycle. In effect, the use of sponge rubber changes the character of the cutting press from one in which simple relative movement between two rigid plate members is required to one in which the sponge rubber functions as a moving working element thus complicating the structure and increasing the tendency of malfunction.

SUMMARY OF THE INVENTON

In accordance with the teachings of the present invention, a cutting die of simplified construction is provided. Generally, the die includes a flat-surfaced support member having a raised cutting surface which is coated with polytetrafluoroethylene. The height of the cutting surface from the support member is greater than the thickness of the adhesive-backed film to be cut and no separate sponge elements are provided. Instead, the relieved portion of the die is, like the cutting surface, coated with polytetrafluoroethylene. With this construction, a cutting of the adhesive-backed film on the underlying release paper is effected without the film sticking to the cutting die; and thus, the annoyance and delay in having to carefully remove the film from the die is avoided. In addition, with the die constructed in accordance with the teachings of the present invention, a sharp cutting of the film and separation of the cut pattern from the remaining portion of the film is effected at lower temperatures than with conventional apparatus. In particular, the heat required to produce a proper cutting of the film with the coated die ranges from 200–250° F. as compared to the 325–350° F. required with conventional equipment. With this lower temperature, the heating of the film may be more accurately localized at the cutting pattern to produce a sharper cut and avoid excessive melting of the pattern inwardly of its cut edge.

DESCRIPTION OF THE PREFERRED EMBODIMENT

Figure 1:
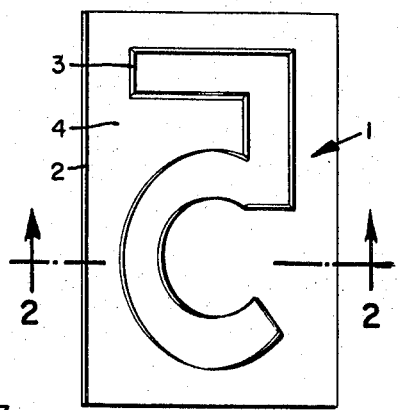
FIG. 1 is a perspective view of the cutting die constructed in accordance with the teachings of the present invention.
Figure 2:
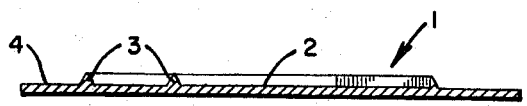
FIG. 2 is a cross-sectional view taken along lines 2—2 of FIG. 1.

As shown in FIG. 1, the cutting die, generally designated at 1, comprises a flat-surfaced support member 2 constructed of metal or other heat retaining material, a raised cutting surface 3 projecting from the support member, and a coating of polytetrafluoroethylene 4 covering both the flat surface of the support member and the cutting surface 3. The coating of polytetrafluoroethylene is relatively thin and just sufficient to cover the surface to which it is adhered. FIG. 2 shows the cutting surface of the die as having a wedge-shaped configuration in cross section. This wedge-shaped character of the cutting surface is the same at all points along the cutting surface.

Figure 3:
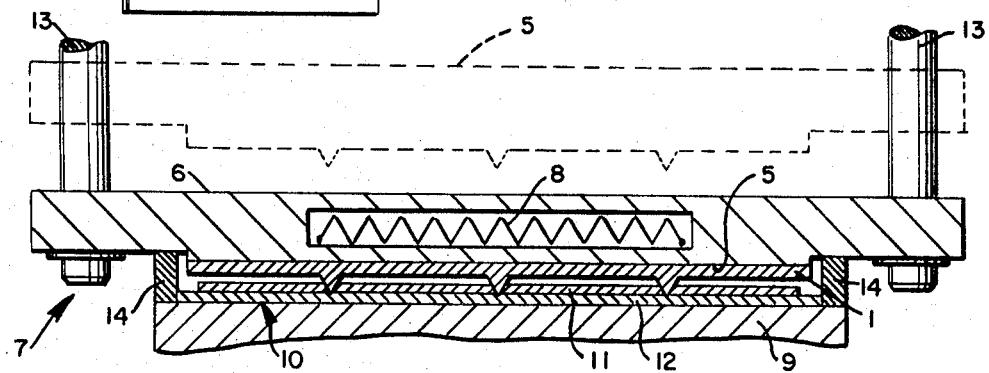
FIG. 3 is a partial cross-sectional view of a cutting press with the cutting die shown in FIG. 1.

FIG. 3 shows the cutting die 1 of FIG. 1 attached to the lower surface 5 of the die support block 6 of a cutting press 7. This support block includes a heating coil 8 for heating the cutting die and is mounted on the framework of the press 7. Also attached to this framework is the bed plate 9 of the press. The die block 6 is mounted for movement relative to the bed plate between an open position, shown in dotted lines in FIG. 3, and a closed position shown in solid lines.

When the press is opened, the product to be cut is inserted onto the bed plate. This product, generally designated 10 in FIG. 3, is comprised of an adhesive-backed thermoplastic film 11 such as a plasticized, cast vinyl film releasably adhered to an underlying release paper 12.

In operation of the cutting apparatus, the die block is lowered to the solid line position shown in FIG. 3; and to effect movement of the block 6 in a vertical direction as it approaches the adhesive-backed film, suitable guides 13 are provided. In the closed position of the cutting apparatus, the cutting surface 3 of the cutting die strikes through the adhesive-backed film and into indenting but non-cutting engagement with the underlying release paper. For limiting this movement of the die toward the bed plate, raised stop members 14 are included in the apparatus. These stop members project upwardly from the bed plate and are adapted to be engaged by the lower surface of the die block 6. It will be noted from FIG. 3 that the height of the raised cutting surface of the die is greater than the thickness of the adhesive-backed film so that the only portion of the film engaging the die is the area of the cut pattern. The wedge-shaped configuration of the surface of the die together with the heating thereof cuts through the film and separates the cut pattern from the remaining portion of the film.

Figure 4:
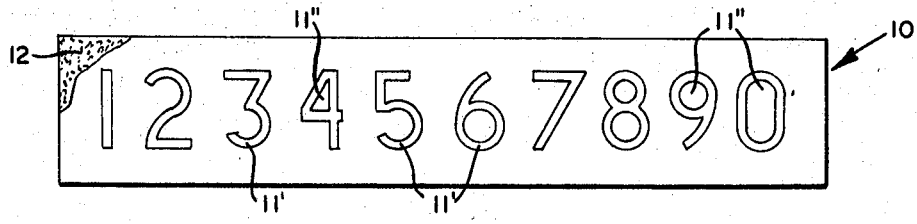
FIG. 4 is a plan view of the composite cut product produced in the cutting press shown in FIG. 3.

The composite product 10 is shown in FIG. 4 as it appears after the cutting operation has been performed thereon. In FIG. 4, the portion of the film defining the cut pattern is designated at 11' while the remaining excess portion of the film is designated at 11". In use, the large excess portion of the film surrounding the numerals may first be removed from the underlying release paper; and due to the separation between it and the numerals, such numerals will remain on the release paper. Then when it is desired to remove a particular numeral, such as numeral 4, it is simply peeled off the release paper; and again, due to the separation between the portions 11' and 11" of the film, the center excess portion 11" of the numeral 4 will remain on the release paper. Alternatively, the large excess portion of the film surrounding the numerals may be left on the release paper and the numerals removed as needed by simply bending the composite product at the line of separation thereof with the excess portion of the film so as to expose an edge which can be grasped to permit peeling of the numeral away from the release paper.

The above description of the present invention has been made with respect to the presently preferred embodiment; however, it is to be understood that various changes may be made thereto without departing from the scope of the invention as set forth in the following claims.

What is claimed is:

1. A cutting die for cutting through an adhesive-backed thermoplastic film releasably adhered to a release paper upon striking of a heated cutting surface of the die through said film and into non-cutting engagement with the release paper, said cutting die comprising:
   (a) a flat-surfaced support member;
   (b) a raised cutting surface configured in the pattern to be cut from said film projecting from the flat surface of said support member and being wedge-shaped in cross section at each point therealong; and
   (c) a thin coating of polytetrafluoroethylene covering said raised cutting surface.

2. A cutting die according to claim 1 wherein:
   (a) said coating of polytetrafluoroethylene further covers the flat surface of said support member.

3. A cutting die according to claim 2 wherein:
   (a) the raised cutting surface of said cutting die projects from said flat-surfaced support member by a distance greater than the thickness of said adhesive-backed thermoplastic film.

4. Apparatus for cutting and adhesive-backed thermoplastic film releasably adhered to a release paper comprising:
   (a) a bed plate for supporting said release paper with the film thereon facing away from said plate;
   (b) a cutting die comprising:
      (1) a flat-surfaced support member construted of a material adapted to be heated to a temperature greater than the melting temperature of said adhesive-backed film,
      (2) a raised cutting surface configured in the pattern to be cut from said film projecting from the flat surface of said support member and being wedge-shaped in cross section at each point therealong, and
      (3) a thin coating of polytetrafluoroethylene covering said raised cutting surface;
   (c) means for mounting said cutting die for movement between a first position spaced from the film on said bed plate and a second position in which said cutting surface extends through said adhesive-backed film and in non-cutting engagement with the underlying release paper; and
   (d) means for heating said cutting surface to a temperature sufficient to cause melting of said adhesive-backed film and separation thereof along the cutting pattern formed therein by said cutting surface.

5. Apparatus for cutting an adhesive-backed film according to claim 4 wherein:
   (a) said coating of polytetrafluoroethylene further covers the flat surface of said support member.

6. Apparatus for cutting an adhesive-backed film according to claim 5 wherein:
   (a) the raised cutting surface of said cutting die projects from said flat-surfaced support member by a distance greater than the thickness of said adhesive-backed film.

7. Apparatus for cutting an adhesive-backed plasticized, cast vinyl film according to claim 6 wherein:
   (a) said cutting die is mounted on a die support block; and
   (b) said means for heating said cutting surface includes a heating coil mounted in said die support block behind said cutting die for heating said cutting die to a temperature of between about 200–250° F.

References Cited
UNITED STATES PATENTS

| | | | |
|---|---|---|---|
| 1,449,445 | 3/1923 | Rand | 83—684 X |
| 2,245,770 | 6/1941 | Franzmann | 83—684 X |
| 2,855,669 | 10/1958 | Duke. | |
| 3,161,554 | 12/1964 | Blackford | 83—171 X |
| 3,379,814 | 4/1968 | Bracey | 83—8 X |

FRANK T. YOST, Primary Examiner

U.S. Cl. X.R.

83—613, 684, 697, 701, 925